(12) United States Patent
Dockendorf et al.

(10) Patent No.: US 10,346,739 B1
(45) Date of Patent: Jul. 9, 2019

(54) METHOD AND APPARATUS FOR LEARNING, PREDICTION, AND RECALL OF SPATIOTEMPORAL PATTERNS

(71) Applicant: HRL Laboratories, LLC, Malibu, CA (US)

(72) Inventors: Karl P. Dockendorf, Jacksonville, FL (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 491 days.

(21) Appl. No.: 14/204,232

(22) Filed: Mar. 11, 2014

Related U.S. Application Data

(60) Provisional application No. 61/780,466, filed on Mar. 13, 2013.

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 3/08* | (2006.01) |

(52) U.S. Cl.
CPC ..................... *G06N 3/08* (2013.01)

(58) Field of Classification Search
CPC .......... G06N 3/049; G06N 3/063; G06N 3/08; G11C 11/54; G11C 15/00; G11C 8/10
See application file for complete search history.

(56) References Cited

U.S. PATENT DOCUMENTS

| | | | |
|---|---|---|---|
| 7,430,546 B1 * | 9/2008 | Suri | G06N 3/08 706/14 |
| 8,037,010 B2 | 10/2011 | Jaros et al. | |
| 8,041,653 B2 | 10/2011 | Nugent | |

(Continued)

OTHER PUBLICATIONS

Vassilis Cutsuridis, Michael Hasselmo, "Dynamics and Function of a CA1 Model of the Hippocampus during Theta and Ripples", from K. Diamantaras, W. Duch, L.S. Iliadis (Eds.): ICANN 2010, Part I, LNCS 6352, 2010, pp. 230-240.*

(Continued)

*Primary Examiner* — Luis A Sitiriche
(74) *Attorney, Agent, or Firm* — Tope-McKay & Associates (57) ABSTRACT

Described is a system for learning, prediction, and recall of spatiotemporal patterns. An input spatiotemporal sequence is learned using a recurrent spiking neural network by first processing the input spatiotemporal sequence using the recurrent spiking neural network. The recurrent spiking neural network comprises neurons having excitatory synaptic connections and inhibitory synaptic connections. Balanced inhibitory connectivity exists between neurons having excitatory synaptic connections. The recurrent spiking neural network uses distinct forms of synaptic plasticity for excitatory synaptic connections and inhibitory synaptic connections, such that excitatory synaptic connections strengthen and inhibitory synaptic connections weaken. In another aspect, the system is able to recall the learned spatiotemporal sequence and predict a future spatiotemporal sequence through activation of the recurrent spiking neural network.

21 Claims, 9 Drawing Sheets

(56) References Cited

U.S. PATENT DOCUMENTS

2009/0017486 A1* 1/2009 Tamas ............... G01N 33/5058 435/29

OTHER PUBLICATIONS

Yousheng Shu, Andrea Hasenstaub & David A. McCormick, "Turning on and off recurrent balanced cortical activity", Nature, vol. 423, May 15, 2003: pp. 288-293.*

M. Steriade and F. Amzica, "Dynamic Coupling Among Neocortical Neurons During Evoked and Spontaneous Spike-Wave Seizure Activity", Journal of Neurophysiology, vol. 72, No. 5, Nov. 1994, pp. 2051-2069.*

Daniel Bush, Andrew Philippides, Phil Husbands, Michael O'Shea, "Dual Coding with STDP in a Spiking Recurrent Neural Network Model of the Hippocampus", PLOS Computational Biology, vol. 6, Issue 7, Jul. 2010, pp. 1-17.*

CMPT 125: Lecture 1: Understanding the Computer Tamara Smyth, tamaras@cs.sfu.ca School of Computing Science, Simon Fraser University Jan. 3, 2009 (Year: 2009).*

Dan, Y. and Poo, M. (2004). Spike timing-dependent plasticity of neural circuits. Neuron, 44(1):23-30.

De Almeida, L., Idiart, M., and Lisman, J. (2007). Memory retrieval time and memory capacity of the ca3 network: role of gamma frequency oscillations. Learning & Memory, 14(11):795-806.

Diba, K. and Buzsaki, G. (2007). Forward and reverse hippocampal place-cell sequences during ripples. Nature neuroscience, 10(10):1241.

Fleischer, J., Gally, J., Edelman, G., and Krichmar, J. (2007). Retrospective and prospective responses arising in a modeled hippocampus during maze navigation by a brain-based device. Proceedings of the National Academy of Sciences, 104(9):3556.

Fortin, N., Agster, K., and Eichenhaum, H. (2002). Critical role of the hippocampus in memory for sequences of events. nature neuroscience 5(5):458-462.

Izhikevich, E. (2003). Simple model of spiking neurons. Neural Networks, IEEE Transactions on, 14(6):1569-1572.

Nessler, B., Pfeiffer, M., and Maass, W. (2010). Stdp enables spiking neurons to detect hidden causes of their inputs. Proc. of NIPS 2009: Advances in Neural Information Processing Systems.

Nolan, C., Wyelh, G., Milford, M., and Wiles, J. (2011). The race to learn: spike timing and stdp can coordinate learning and recall in ca3. Hippocampus, 21(6):647-660.

O'Keefe, J. and Recce, M. (1993). Phase relationship between hippocampal place units and the eeg theta rhythm. Hippocampus, 3(3):317-330.

Pfister, J. and Gerstner, W. (2008). Beyond pair-based stdp: a phenomenogical rule for spike triplet and frequency effects.

Van Strien, N., Cappaert, N., and Witter, M. (2009). The anatomy of memory: an interactive overview of the parahippocampal-hippocampal network. Nature Reviews Neuroscience, 10(4):272-282.

Pfister, J. P., and Gerstner, W. (2006). Triplets of spikes in a model ofspike timing-dependent plasticity. J. Neurosci. 26, 9673-9682.

Caporale, N., and Dan, Y. (2008). Spike timing-dependent plasticity: a Hebbian learning rule. Annu. Rev. Neurosci. 31, 25-46.

Lisman, J., Talamini, L., and Raffone, A. (2005). Recall of memory sequences by interaction of the dentate and CA3: a revised model of the phase precession. Neural Netw. 18, 1191-1201.

Buonomano, D. (2005). A learning rule for the emergence of stable dynamics and timing in recurrent networks. J. Neurophysiol. 94, 2275-2283.

Rall, W. (1962) Electrophysiology of a dendritic neuron model. Biophysical Journal 2: 145-167.

Markram, H., Gerstner, W., and Sjostrom, P. (2012). Spiketiming-dependent plasticity: a comprehensive overview. Front Synaptic Neurosci. 4:2.

Moser, Edvard I, Kropff, Emilo, and Moser, May-Britt (2008). Place cells, grid cells, and the brain's spatial representation system. Annual Review of Neuroscience. 31: 69-89.

Dockendorf, K. and Srinivasa, N. (2013). Learning and prospective recall of noisy spike episodes. Front. Comput. Neurosci. 7:80.

Taub, A.H., Katz, Y., and Lampi I. (2013). Cortical balance of excitation and inhibition is regulated by the rate of synaptic activity. J. Neurosci. 33(36): 14359-68.

* cited by examiner

METHOD AND APPARATUS FOR LEARNING, PREDICTION, AND RECALL OF SPATIOTEMPORAL PATTERNS

CROSS-REFERENCE TO RELATED APPLICATIONS

This is a Non-Provisional patent application of U.S. Provisional Application No. 61/780,466, filed in the United States on Mar. 13, 2013, entitled, "Method and Apparatus for Learning, Prediction, and Recall of Spatiotemporal Patterns."

GOVERNMENT LICENSE RIGHTS

This invention was made with government support under U.S. Government Contract Number SyNAPSE HRL0011-09-C-001. The government has certain rights in the invention.

BACKGROUND OF THE INVENTION

(1) Field of Invention

The present invention relates to a system for learning, prediction, and recall of spatiotemporal patterns and, more particularly, to a system for learning, prediction, and recall of spatiotemporal patterns using a spiking model of the hippocampus.

(2) Description of Related Art

Simulated neuronal networks (also known as neural networks) have been shown to process data, learn patterns, and demonstrate various biologic phenomena. Fleischer's work (see the List of Incorporated Cited Literature References, Literature Reference No. 4) with hippocampal rate models and Darwin X and XI shows the generation of some prospective and retrospective firing. Fleischer's work shows that there is a strong difference between rate and spiking models, but there is no mention of pattern encoding or queued recall of spike trains. In addition, Nolan's work (see Literature Reference No. 8) with a spiking hippocampal model demonstrates that a Cornu Ammonis 3 (CA3) network can learn to spike in advance of dentate gyrus (DG) activity. However, the work lacks recurrent collaterals in CA3 and does not link sequences or recall them.

Furthermore, in U.S. Pat. No. 8,037,010, entitled, "Spatio-Temporal Learning Algorithms in Hierarchical Temporal Networks" (hereinafter referred to as the '010 patent) and U.S. Pat. No. 8,041,653, entitled, "Method and System for a Hierarchical Temporal Memory Utilizing a Router Hierarchy and Hebbian and Anti-Hebbian Learning" (hereinafter referred to as the '653 patent), a hierarchical temporal memory (HTM) is used for learning and identifying (or categorizing) spatiotemporal patterns. However, HTM systems do not recall patterns in a self-governed series of activity spikes.

Previous work in machine learning and recall demonstrates auto-associative pattern completion after deliberate calculation of synaptic weights for a non-temporal pattern. In de Almeida's work (see Literature Reference No. 2), the pattern completing ability of a recurrent spiking CA3 network is demonstrated by the precalculation of a fixed weight matrix and partial pattern presentation. Moreover, the hierarchical networks described in U.S. patent application Ser. No. 13/160,406, entitled, "Recall System Using Spiking Neuron Networks" can learn to identify patterns, but not reconstruct a sequence of patterns.

Each of the prior methods described above exhibit limitations that make them incomplete. Thus, a continuing need exists for a method for learning patterns online that can be activated such that the network activity self-propagates, reigniting previously stored patterns.

SUMMARY OF THE INVENTION

The present invention relates to system for learning, prediction, and recall of spatiotemporal patterns. The system comprises one or more processors and a memory having instructions such that when the instructions are executed, the one or more processors perform multiple operations. The system learns at least one input spatiotemporal sequence using a recurrent spiking neural network by first processing the at least one input spatiotemporal sequence having a beginning and an end using the recurrent spiking neural network. The recurrent spiking neural network comprises a plurality of neurons having synaptic connections comprising excitatory synaptic connections and inhibitory synaptic connections. Balanced inhibitory connectivity exists between neurons having excitatory synaptic connections. The recurrent spiking neural network uses distinct forms of synaptic plasticity for excitatory synaptic connections and inhibitory synaptic connections, such that excitatory synaptic connections strengthen and inhibitory synaptic connections weaken.

In another aspect, the system recalls the at least one learned spatiotemporal sequence and predicts at least one future spatiotemporal sequence through activation of the recurrent spiking neural network.

In another aspect, an effective pairing between any at least one ensemble of coactive neurons and another neuron scales from net inhibitory to net excitatory depending on the ensemble of coactive neurons.

In another aspect, the system reactivates at least one ensemble of coactive neurons at the beginning or the end of the at least one spatiotemporal sequence after learning has occurred to demonstrate prediction and recall of the at least one spatiotemporal sequence.

In another aspect, the spiking neural network associates each neuron with at least one ensemble of coactive neurons.

In another aspect, the system uses neurons with different ensembles for each spatiotemporal sequence to increase the number of spatiotemporal sequences that can be learned.

In another aspect, the system implements an inhibitory synapse rule, wherein an ensemble of coactive neurons reduces their inhibitory coupling, and neurons that fire independently have strong inhibitory connectivity. The system further implements an excitatory synapse rule, wherein synapses that contribute to activation of a neuron are strengthened, and synapses that are activated while the neuron is rebounding are weakened.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for learning, prediction, and recall of spatiotemporal patterns and, more particularly, to a system for learning, prediction, and recall of spatiotemporal patterns using a spiking model of the hippocampus. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the an that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Dan, Y. and Poo, M. (2004). Spike timing-dependent plasticity of neural circuits. Neuron, 44(1):23-30.
2. De Almeida, L., Idiart, M., and Lisman, J. (2007). Memory retrieval time and memory capacity of the ca3 network: role of gamma frequency oscillations. Learning & Memory, 14(11):795-806.
3. Diba, K. and Buzsaki, G. (2007). Forward and reverse hippocampal place-cell sequences during ripples. Nature neuroscience, 10(10):1241.
4. Fleischer, J., Gally, J., Edelman, G., and Krichmar, J. (2007). Retrospective and prospective responses arising in a modeled hippocampus during maze navigation by a brain-based device. Proceedings of the National Academy of Sciences, 104(9):3556.
5. Fortin, N., Agster, K., and Eichenbaum, H. (2002). Critical role of the hippocampus in memory for sequences of events. nature neuroscience, 5(5):458-462.
6. Izhikevich, E. (2003). Simple model of spiking neurons. Neural Networks, IEEE Transactions on, 14(6):1569-1572.
7. Nessler, B., Pfeiffer, M., and Maass, W. (2010). Stdp enables spiking neurons to detect hidden causes of their inputs. Proc. of NIPS 2009: Advances in Neural Information Processing Systems.
8. Nolan, C., Wyeth, G., Milford, M., and Wiles, J. (2011). The race to learn: spike timing and stdp can coordinate learning and recall in ca3. Hippocampus, 21(6):647-660.
9. O'Keefe, J. and Recce, M. (1993). Phase relationship between hippocampal place units and the eeg theta rhythm. Hippocampus, 3(3):317-330.
10. Pfister, J. and Gerstner, W. (2008). Beyond pair-based stdp: a phenomenogical rule for spike triplet and frequency effects.

11. Van Strien, N., Cappaert, N., and Witter, M. (2009). The anatomy of memory: an interactive overview of the parahippocampal-hippocampal network. Nature Reviews Neuroscience, 10(4):272-282.
12. Pfister, J. P., and Gerstner, W. (2006). Triplets of spikes in a model of spike timing-dependent plasticity. J. Neurosci. 26, 9673-9682.
13. Caporale, N., and Dan, Y. (2008). Spike timing-dependent plasticity: a Hebbian learning rule. Annu. Rev. Neurosci. 31, 25-46.
14. Lisman, J., Talamini, L., and Raffone, A. (2005). Recall of memory sequences by interaction of the dentate and CA3: a revised model of the phase precession. Neural Netw. 18, 1191-1201.
15. Buonomano, D. (2005). A learning rule for the emergence of stable dynamics and timing in recurrent networks. J. Neurophysiol. 94, 2275-2283.
16. Rail, W. (1962b) Electrophysiology of a dendritic neuron model. Biophys. J. 2:145-167.
17. Markram, H., Gerstner, W., and Sjostrom, P. (2012). Spiketiming-dependent plasticity: a comprehensive overview. Front Synaptic Neurosci. 4:2.
18. Moser, Edvard I, Kropff, Emilo, and Moser, May-Britt (2008). Place cells, grid cells, and the brain's spatial representation system. Annual Review of Neuroscience. 31: 69-89.
19. Dockendorf, K. and Srinivasa, N. (2013). Learning and prospective recall of noisy spike pattern episodes. Front. Comput. Neurosci. 7:80.
20. Taub, A. H., Katz, Y., and Lampl I. (2013). Cortical balance of excitation and inhibition is regulated by the rate of synaptic activity. J. Neurosci. 33(36): 14359-68.

(2) Principal Aspects

The present invention has three "principal" aspects. The first is a system for learning, prediction, and recall of spatiotemporal patterns. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for learning, prediction, and recall of spatiotemporal patterns. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

The hippocampus of mammals has been shown to be instrumental in the formation of new spatiotemporal memories (see Literature Reference No. 5). Moreover, it has been demonstrated that the hippocampal Cornu Ammonis 3 (CA3) subfield exhibits the phenomena of phase procession (see Literature Reference No. 9). During phase procession, the upcoming sequences of activity are anticipated during the following gamma cycles of a theta cycle. CA3 is known to contain many recurrent connections and receive large synapses from the dentate gyrus (DG) subfield (see Literature Reference No. 11). Together, with a specific ratio of scalings and the appropriate synapse weight update rules, this architecture can be simulated to generate encoding and recall of spatiotemporal sequences.

While functional rate models and some simple spiking models exist for these regions (i.e., CA3 and DI), truly functional spiking models of this architecture have remained elusive. The present invention is a spiking recurrent network that is capable of completing coactive patterns and replay or pre-play of spatio-temporal patterns, respectively. In a recurrent neural network, connections between neurons form a directed cycle, allowing the network to exhibit dynamic temporal behavior. Recurrent neural networks can use their internal memory to process sequences of inputs.

Previous works have demonstrated auto-associative pattern completion after deliberate calculation of synaptic weights for a non-temporal pattern (see Literature Reference Nos. 14 and 15). The present invention learns patterns online (i.e., when data is presented without the need to store the data offline) and can then be activated in such a way that the network activity self-propagates, reigniting previously stored patterns. Patterns can be retrieved in forward or reverse order. The invention described herein enables the learning and cued recall of patterns using spiking neural networks.

(4) Specific Details

(4.1) Spiking Network Architecture and Neurons

The model according to the principles of the present invention is comprised of a plurality of spiking neurons (such as those proposed in Literature Reference No. 6) with axonal delays and synaptic connections. A small version of the network may contain all-to-all recurrent connectivity; however, larger versions use increasingly sparse number of connections due to an absolute upper bound on the number of inputs under which the simulated neurons function in the appropriate regime. All-to-all connectivity implies that every neuron is connected to every other neuron in the network. With sparse connections (as with all-to-all connectivity), it is important to have balanced inhibitory connectivity between neurons that have excitatory connections so that the effective pairing between any group of coactive neurons (i.e., an ensemble) and another neuron scales from net inhibitory to net excitatory depending on the active ensemble. Literature Reference No. 20 provides a description of balanced inhibitory connectivity. One non-limiting implementation of this is a network that has an inhibitory connection between each neuron that possesses an excitatory connection with additional inhibitory connections onto that neuron such that the postsynaptic neuron may be net inhibited by other neurons when the presynaptic neuron is active in ensembles without the postsynaptic neuron even if the direct connection expressed is net excitatory.

A network with the aforementioned properties can then associate positively or, by default, negatively each neuron with each ensemble. As a result, these networks exhibit the powerful property of rapid learning or recall of spike patterns whether they code for sequential spatial, sensory, and/or other data. These networks can be scaled up in size and, as a result, store more patterns as long as the balance is maintained between excitation and inhibition in the network. However, as the network is scaled up, the sparseness in the recurrent connectivity increases, and, as a result, the size of ensembles must increase to ensure a connection between each ensemble and its constituent neurons. One possible way to allow for additional scale up is the use of non-point neurons, such as compartmental models which are described in Literature Reference No. 16, which can function with a higher degree of impinging neurons.

Figure 1:
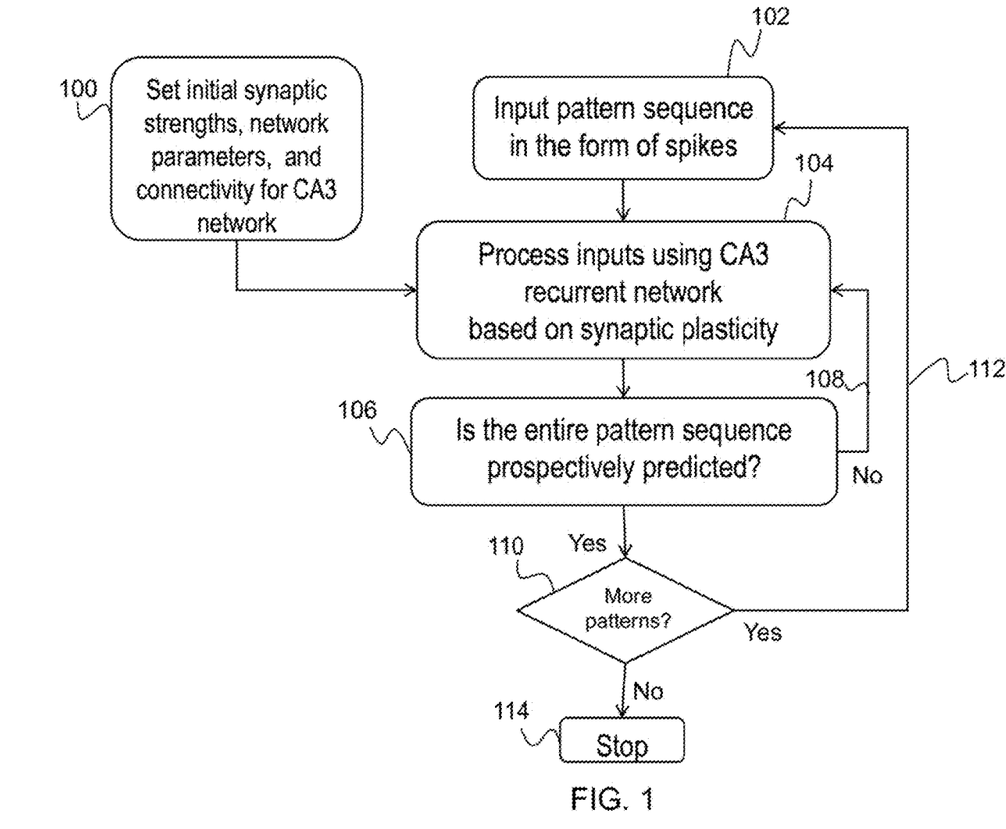
FIG. 1 is a flow diagram of the training process according to the principles of the present invention.

FIG. 1 is a flow diagram depicting the training process for the model of the present invention. Initial synaptic strengths, network parameters, and connectivity for the CA3 recurrent network are set in a first step 100. In a second step 102, the system receives an input pattern sequence in the form of spikes, wherein spikes represent the output of neurons processing the output of a sensor. In a third step 104, the inputs are processed using the CA3 recurrent network based on synaptic plasticity (described below). In a fourth step 106, the system determines whether the entire pattern sequence is prospectively predicted (described below). If not, a first feedback loop 108 returns the process to the third step 104. If the entire pattern sequence is predicted, then, in a fifth step 110, the system determines whether there are more patterns to predict. If there are more patterns to predict, a second feedback loop 112 returns the process to the second step 102. If it is determined that there are no more patterns to predict, then the training process stops 114.

Figure 2:
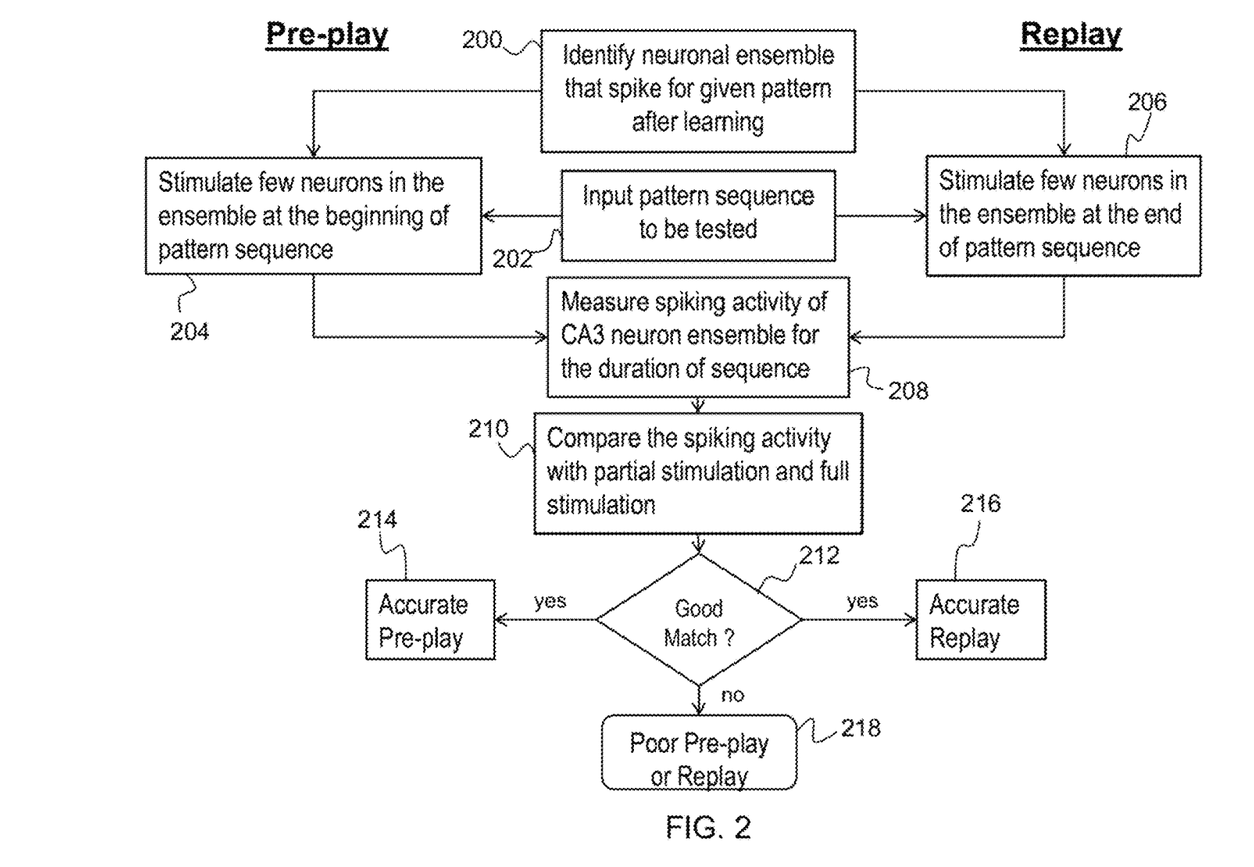
FIG. 2 is a flow diagram illustrating testing of pre-play and replay functions according to the principles of the present invention.

FIG. 2 is a flow diagram illustrating the testing of the pre-play and replay functions according to the principles of the present invention. First, the system identifies a neuronal ensemble that spikes for a given pattern after learning 200. Next, the system receives an input pattern sequence to be tested 202. For the pre-play function, a few neurons in the neuronal ensemble at the beginning of the input pattern sequence are stimulated 204. For the replay function, a few neurons in the neuronal ensemble at the end of the input pattern sequence are stimulated 206. Following neuron stimulation, the spiking activity of the CA3 neuronal ensemble is measured for the duration of the sequence 208. The spiking activity is then compared with partial stimulation and full stimulation 210. Based on the comparison, the system determines whether there is a good match 212. If there is a good match, then the output is an accurate pre-play 214 and/or replay 216. If a good match does not exist, then there is a poor pre-play and/or replay 218.

(4.2) Synapses and Synaptic Plasticity

For the fixed network to learn, synaptic plasticity is required. Two different forms of plasticity are used for the model of the present invention: one for excitatory and one for inhibitory synapses. The inhibitory synapse rule is symmetrical (but does not strictly have to be), and functionally implements a rule where coactive neurons reduce their inhibitory coupling, but neurons that fire independently have strong inhibitory connectivity. Complementary to the inhibitory weight changes, excitatory changes are asymmetric (but do not strictly have to be) and strengthen synapses that contribute to the activation of the neuron and weaken those that are activated while the neuron is rebounding unless the postsynaptic neuron activates again.

Figure 3A:
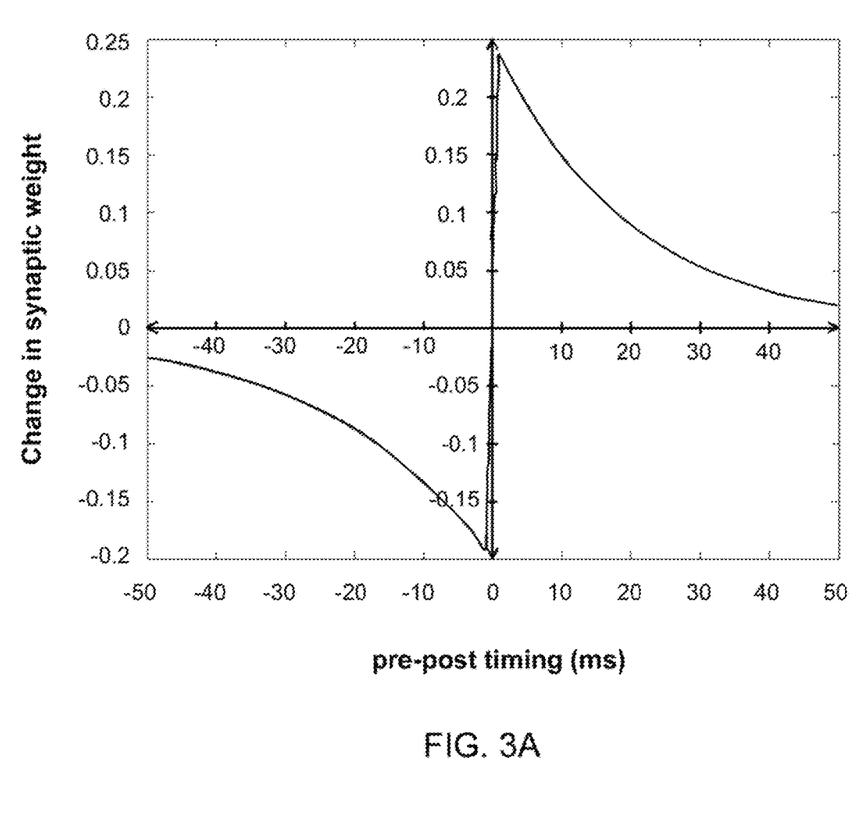
FIG. 3A is a plot showing a couplet rule for changing the synaptic weights based on the timing difference between a pair of spikes, one pre-synaptic and one post-synaptic according to the principles of the present invention.

FIG. 3A shows couplet (or pair-based) excitatory spike-timing-dependent plasticity (STDP) rule for changing the synaptic weights based on the timing difference between a pair of spikes (or couplet), one pre-synaptic and one post-synaptic. Along the x-axis is the timing difference (pre-post), while the y-axis represents the change in excitatory synaptic weight. This is a single curve that passes through the origin with a big discontinuity in the middle. The portion of the curve that is above zero on the right represents the "rule for potentiation" which states that if the pre-synaptic spike occurs earlier than the post-synaptic spike, then the synapse will potentiate (or increase in weight) as dictated by the portion of the curve above zero on the right. The situation is exactly reversed for the other case. The "rule for depression" which states that if the pre-synaptic spike occurs after the post-synaptic spike, then the synapse will depress (or decrease in weight) is dictated by the portion of the curve below zero on the left. If the |pre-post| is very large then there is no weight change. The couplet rule is described in Literature Reference No. 17.

Figure 3B:
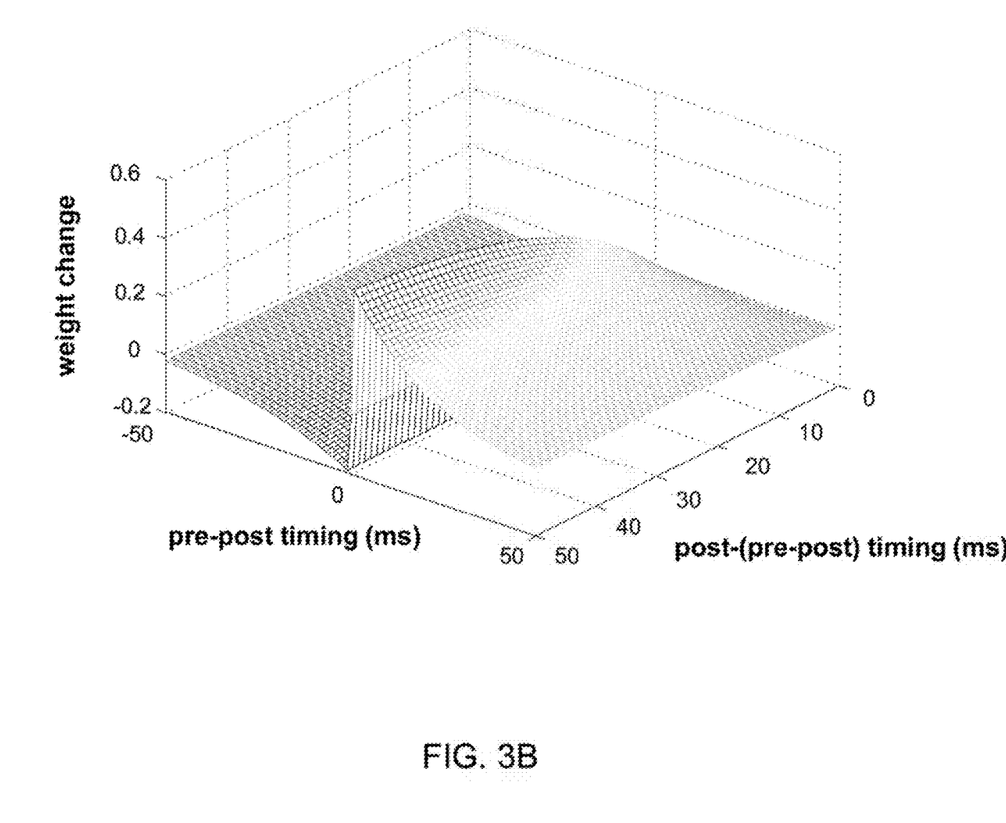
FIG. 3B is a plot showing an extension to the couplet rule illustrated in FIG. 3A which considers both pre-post and post-pre timing difference effects on the change in excitatory synaptic weights according to the principles of the present invention.

FIG. 3B depicts a plot of an extension rule (i.e., triplet excitatory STDP rule) of the couplet rule plot in FIG. 3A. The triplet excitatory STDP rule considers both pre-post and post-pre timing difference effects on the change in excitatory synaptic weights. Unlike the previous rule, the weight changes according to this rule is a function of both the pre-post as well as the post-pre timing differences, thus generating a three-dimensional plot. If the |pre-post| and |post-pre| are very large, then there is no weight change. The triplet rule is described in Literature Reference No. 10.

Figure 3C:
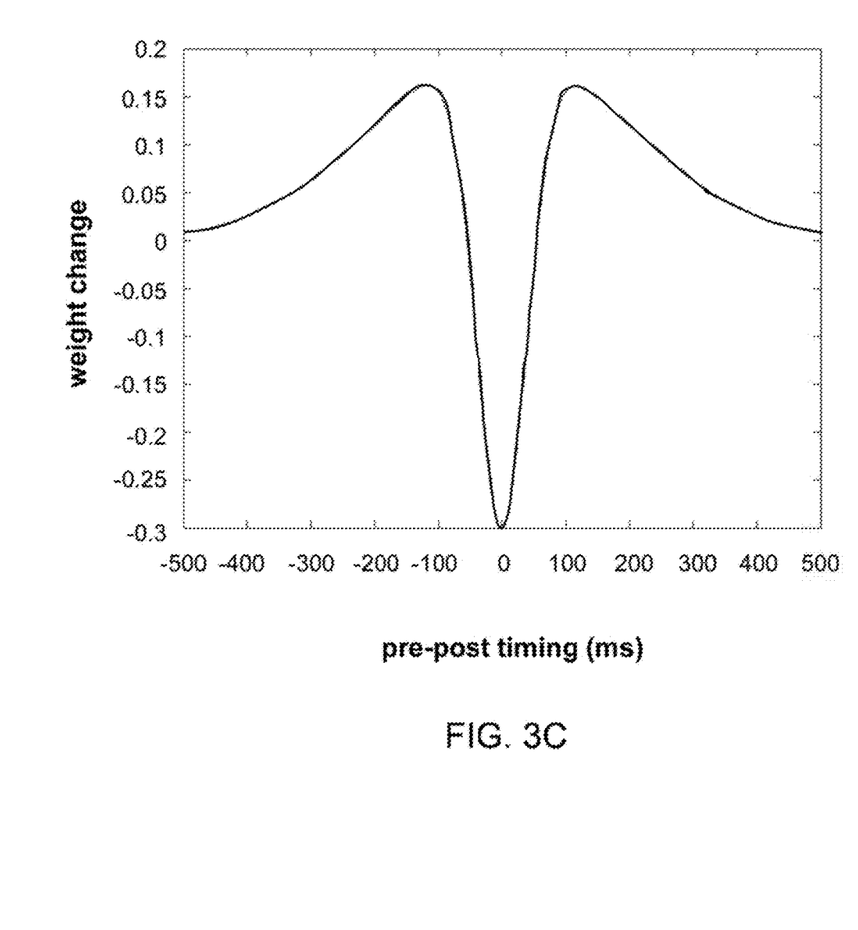
FIG. 3C is a plot showing how the inhibitory synaptic weights are affected by the timing difference between pre- and post-synaptic spikes according to the principles of the present invention.

The plot in FIG. 3C illustrates the inhibitory STDP rule and shows how the inhibitory synaptic weights are affected by the timing difference between pre- and post-synaptic spikes. The above two rules (depicted in FIGS. 3A and 3B) are for synapses of the excitatory kind. The plot shown in FIG. 3C describes the STDP rule for synapses that are inhibitory, where the rules for changing the inhibitory weights are described. In particular, if the pre-post or post-pre timing difference is within a certain value (as dictated by the big bump in the middle), then the synapses are potentiated, and if not, they are depressed (the two deep wells on either side). If the |pre-post| is very large then there is no weight change. The inhibitory rule is described in Literature Reference No. 1.

The exact time constants or amplitudes associated with these rules are not required for proper learning and function. The exact form of excitatory plasticity represented in FIGS. 3A-3C is not strictly required. Any rule that associates causal or information transfer relationships will work. However, the exact implementation will affect the nuances of pattern learning and recall. As non-limiting examples, FIGS. 3A and 3B show couplet- and triplet-based STDP learning rules, respectively. The triplet-based rule forms more symmetric connections between a pair of neurons (see Literature Reference No. 10), whereas the couplet-based rule learns only to increase the forward relationship (see Literature Reference No. 17). As a result, the triplet-based rule can recall patterns in reverse order, whereas the couplet-based rule can only recall in the forward direction.

Due to the confluence of inhibitory connectivity and sparseness of the representation, rapid plasticity in general and very rapid inhibitory plasticity may be exhibited without sacrificing the stability of the network or previously learned representations.

(4.3) Pattern Sequences

The input format has significant effect on the encoding of the sequences and subsequent recall. The input neurons are connected to very few CA3 neurons (i.e., spiking neurons). In the data presented in the present application, one-to-one input neuron to CA3 neuron connections are used. However, learning still occurs if each input neuron is connected to a handful of CA3 neurons. The synaptic inputs to this CA3 network (i.e., recurrent spiking network) are large (approximately five times the maximum allowed weight of recurrent synapses) and fixed (but this need not be the case) so that a spatiotemporal pattern can be strongly forced onto the downstream recurrent network model. This strong influence results in the recurrent CA3 network having a high likelihood to spike in a similar manner as the upstream inputs. As the synapses make plastic adjustments reflective of the spike association bias, the excitatory synapses strengthen, and the inhibitory synapses weaken. Once that occurs, the patterns have been learned.

Figure 4:
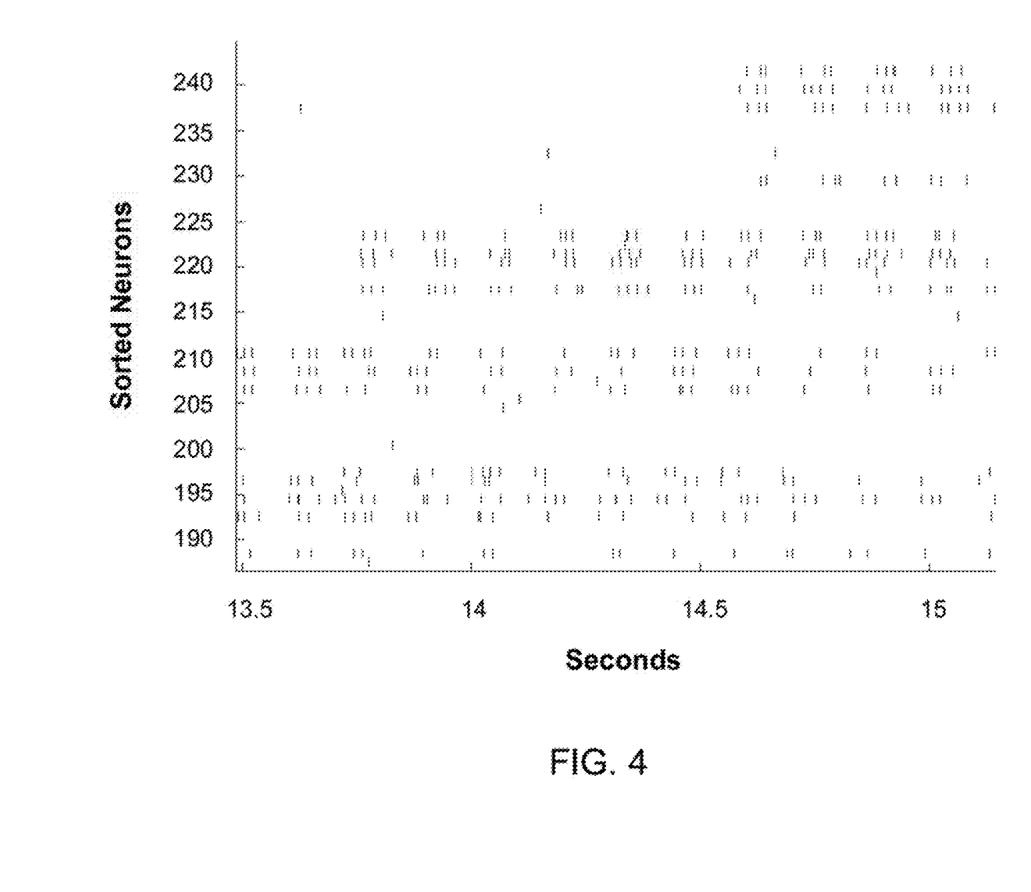
FIG. 4 is plot showing sample spiking activity of input neurons according to principles of the present invention.

Patterns are presented simultaneously for each active spatiotemporal memory neuron or, to bias forward learning, they are presented in subsequent gamma cycles. The use of gamma and theta frequency modulation forces short, high frequency bursts that activate subsequent nodes prospectively (see Literature Reference Nos. 2 and 14). The net inhibitory effect of on-going firing limits prospective firing to a handful of future spatiotemporal neurons. FIG. 4 shows sample spiking activity of input neurons. Notice the noise added to timings and variance in the number of spikes per theta cycle. In other words, the spike patterns are not exactly the same in terms of which time they occur.

The diversity and size of the number of neurons in ensembles affects the number of patterns that can be stored. First, using neurons with different ensembles for each spatiotemporal pattern increases the number of patterns that can be learned versus using defined ensembles in different orders. In other words, by manually separating the neurons that process each spatiotemporal input, it minimizes overlap and, thus, improves the signal to noise ratio, as described in Literature Reference No. 19. Also, given a fixed pattern length and size, increasing the network size increases the number of patterns that can be stored. In experimental studies of the present invention, randomly selected neurons were used to express artificial spatiotemporal patterns. However, this need not be the case.

(4.4) Recall and Reverse Replay

In the hippocampus, patterns of place cell activity are pre-played in forward order or replayed in reverse order at the beginning and end, respectively, of a linear track (see Literature Reference No. 3). Place cells are cells found in the CA1 region of the hippocampus that are known to respond to specific locations in the environment (see Literature Reference No. 18). Similarly, the present invention demonstrates pre-play and replay of spiking activity of neuron ensembles. This is accomplished by reactivating the ensemble at the beginning or end of the spatiotemporal sequence after learning has occurred. The ensemble is reactivated by short gamma frequency bursts (e.g., 1-4 spikes) from each (or many of the) neuron in the initial or end segment of the ensemble. This could be considered reminiscent of the downstream spiking activity due to the sensory input at the beginning or end of a linear track. The exact duration or frequency of input is not required but is the preferred method for biologic plausibility.

Figure 5:
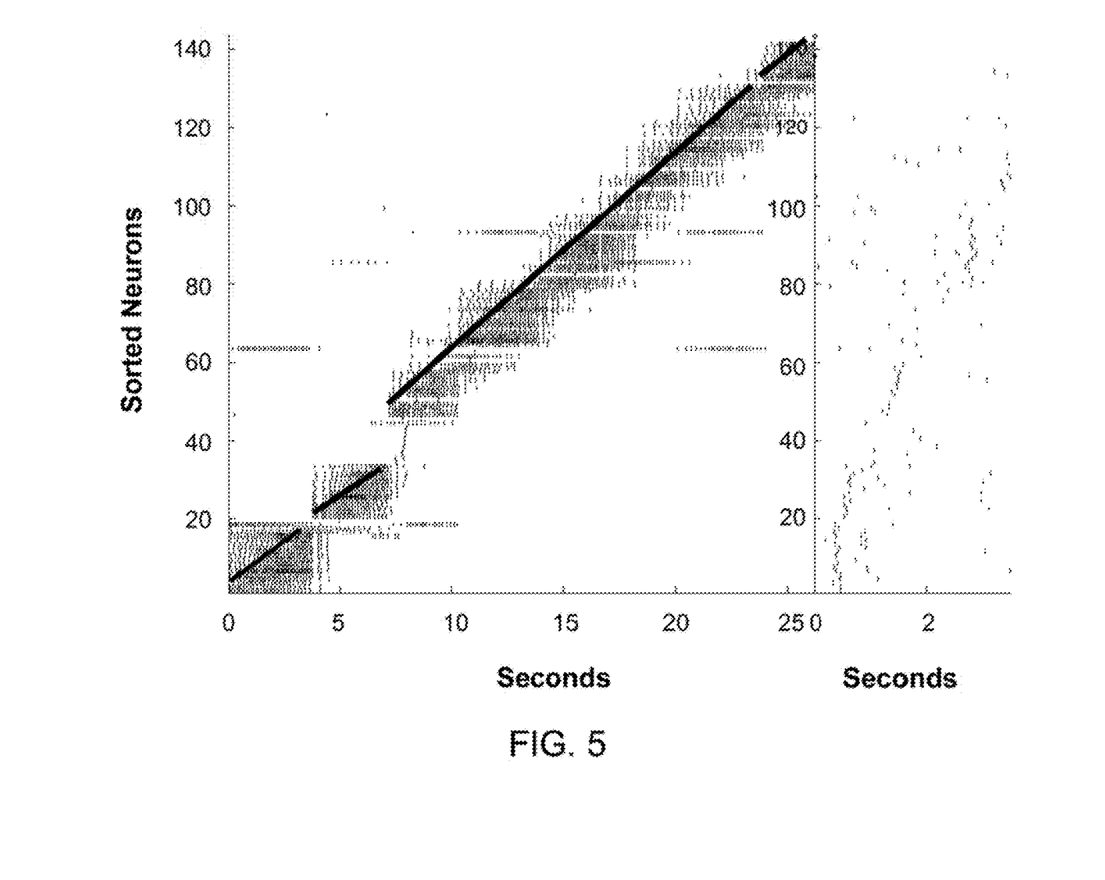
FIG. 5 is a plot of behavior timescale episode activity of simulated CA3 neurons according to principles of the present invention.

The pre-play of activity, as illustrated in FIG. 5, can be viewed as a full recall of a previous memory. A spiking network that can perform free recall of the ensemble sequence has yet to be demonstrated in a simulated network. The recall of previous memories based on partial patterns means that the results of various behaviors can be predicted given a similar sensory match to other experiences. The left side of FIG. 5 depicts behavior timescale episode activity of simulated CA3 neurons. Solid lines indicate the beginning of directly input driven activity, and to the left of the solid lines is prospective firing. On the right side is an example of forward recall of the episode to the left on a compressed timescale given an initial, short, gamma frequency burst of input to the first few neurons. For each solid line, the spikes for a given neuron on the right side of the solid line represent the recall activity of a pattern for that neuron. The reason for the partial pattern is that this spiking activity is evoked by a brief burst of spikes as inputs to a neuron ensemble, where the entire ensemble is not stimulated and only part of it stimulated. The entire ensemble starts to fire after this initial stimulation.

Neurons are sorted based on the time at which they emit a spike during the testing period. The significance of FIG. 5 is that it shows that the network neurons are capable of both recall and prospective firing based on just partial stimulation of the neuronal ensemble, thereby showing that the network has learned the spatio-temporal pattern sequence robustly such that it can both predict and recall it.

Storage memories are widely used in computer architectures. As computers push toward neurocomputational paradigms, the need for a spatiotemporal memory becomes apparent. In the near-term, dense analog storage of spatio-temporal sequences as synaptic weights has the potential for a wide variety of tasks. Moreover, the completion of patterns has application in error correction and denoising of audio, video, or communication signals. Using the pre-play (or recall) feature of the present invention, prediction of the future based on past experiences could be performed, which is useful for prognostics, behavior prediction, or motion in scene understanding.

Figure 6:
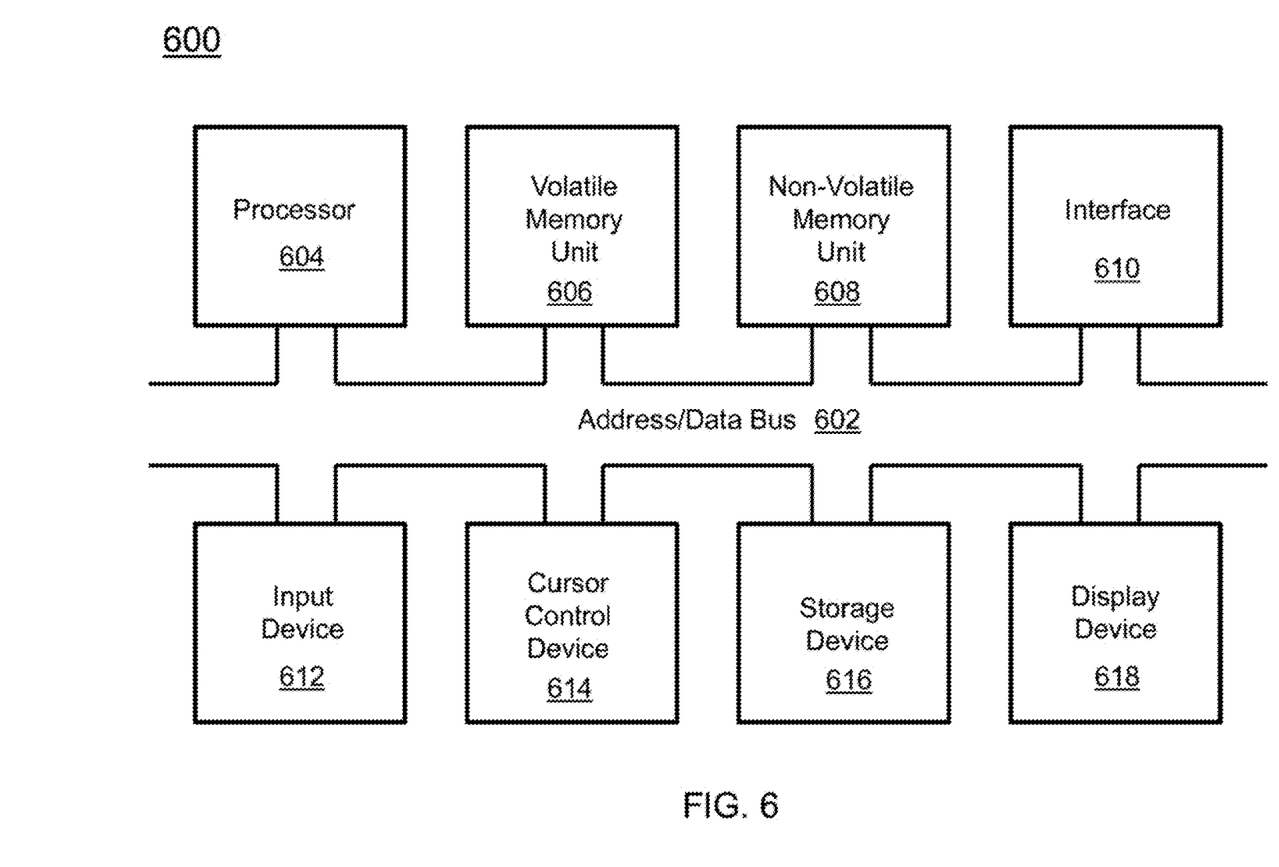
FIG. 6 is an illustration of a data processing system according to principles of the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM ("EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In an embodiment, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
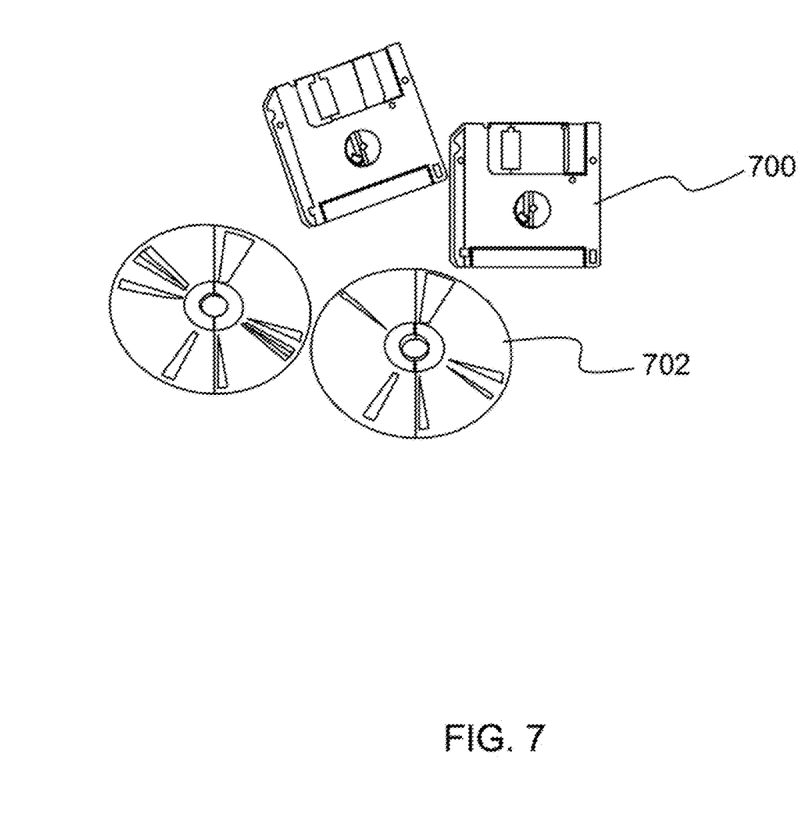
FIG. 7 is an illustration of a computer program product according to principles of the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for learning, prediction, and recall of spatiotemporal patterns, the system comprising:

one or more processors and a non-transitory memory having instructions encoded thereon such that when the instructions are executed, the one or more processors perform operations of:

receiving a noisy signal having a plurality of spatiotemporal sequences;

learning an input spatiotemporal sequence of the noisy signal online using a recurrent spiking CA3 neural network by:

processing the input spatiotemporal sequence having a beginning and an end using the recurrent spiking CA3 neural network based on synaptic plasticity;

determining whether the entire spatiotemporal sequence is prospectively predicted; and determining whether there are additional spatiotemporal sequences to predict;

enabling pre-play and/or replay of the spatiotemporal sequence, allowing the spatiotemporal sequence to be activated from the beginning or end of the spatiotemporal sequence such that the spatiotemporal sequence can be retrieved in a forward or a reverse order; and performing cued recall of a previously learned spatiotemporal sequence based on a partial spatiotemporal sequence using the pre-play and/or replay of the spatiotemporal sequence, wherein the recurrent spiking CA3 neural network comprises a plurality of neurons having synaptic connections comprising excitatory synaptic connections and inhibitory synaptic connections;

wherein balanced inhibitory connectivity exists between neurons having excitatory synaptic connections; and wherein the recurrent spiking CA3 neural network uses distinct forms of synaptic plasticity for excitatory synaptic connections and inhibitory synaptic connections, such that excitatory synaptic connections strengthen and inhibitory synaptic connections weaken;

completing a pattern in a spatiotemporal sequence of the noisy signal using the learned input spatiotemporal sequence; and denoising the noisy signal using the completed pattern.

2. The system as set forth in claim 1, wherein the one or more processors further perform operations of:
   completing coactive patterns in spatiotemporal sequences;
   generalizing recall based on similarity to other experiences; and
   predicting at least one future spatiotemporal sequence through activation of the recurrent spiking CA3 neural network.

3. The system as set forth in claim 2, wherein an effective pairing between any at least one ensemble of coactive neurons and another neuron scales from net inhibitory to net excitatory depending on the ensemble of coactive neurons.

4. The system as set forth in claim 3, wherein the one or more processors further perform an operation of reactivating at least one ensemble of coactive neurons at the beginning or the end of the at least one spatiotemporal sequence after learning has occurred to demonstrate prediction and recall of the at least one spatiotemporal sequence.

5. The system as set forth in claim 4, wherein the recurrent spiking CA3 neural network associates each neuron with at least one ensemble of coactive neurons.

6. The system as set forth in claim 5, wherein the one or more processors further perform an operation of using neurons with different ensembles for each spatiotemporal sequence to increase the number of spatiotemporal sequences that can be learned.

7. The system as set forth in claim 1, wherein the one or more processors further perform operations of:
   implementing an inhibitory synapse rule, wherein an ensemble of coactive neurons reduces their inhibitory coupling, and neurons that fire independently have strong inhibitory connectivity; and
   implementing an excitatory synapse rule, wherein synapses that contribute to activation of a neuron are strengthened, and synapses that are activated while the neuron is rebounding are weakened.

8. A computer-implemented method for learning, prediction, and recall of spatiotemporal patterns, comprising:
   an act of causing one or more processors to execute instructions stored on a non-transitory memory such that upon execution, the one or more processors performs operations of:
      receiving a noisy signal having a plurality of spatiotemporal sequences;
      learning an input spatiotemporal sequence of the noisy signal online using a recurrent spiking CA3 neural network by:
         processing the input spatiotemporal sequence having a beginning and an end using the recurrent spiking CA3 neural network based on synaptic plasticity;
         determining whether the entire spatiotemporal sequence is prospectively predicted; and
         determining whether there are additional spatiotemporal sequences to predict;
      enabling pre-play and/or replay of the spatiotemporal sequence, allowing the spatiotemporal sequence to be activated from the beginning or end of the spatiotemporal sequence such that the spatiotemporal sequence can be retrieved in a forward or a reverse order; and
      performing cued recall of a previously learned spatiotemporal sequence based on a partial spatiotemporal sequence using the pre-play and/or replay of the spatiotemporal sequence,
   wherein the recurrent spiking CA3 neural network comprises a plurality of neurons having synaptic connections comprising excitatory synaptic connections and inhibitory synaptic connections;
   wherein balanced inhibitory connectivity exists between neurons having excitatory synaptic connections; and
   wherein the recurrent spiking CA3 neural network uses distinct forms of synaptic plasticity for excitatory synaptic connections and inhibitory synaptic connections, such that excitatory synaptic connections strengthen and inhibitory synaptic connections weaken,
   completing a pattern in a spatiotemporal sequence of the noisy signal using the learned input spatiotemporal sequence; and
   denoising the noisy signal using the completed pattern.

9. The method as set forth in claim 8, wherein the one or more processors further perform operations of:
   completing coactive patterns in spatiotemporal sequences;
   generalizing recall based on similarity to other experiences; and
   predicting at least one future spatiotemporal sequence through activation of the recurrent spiking CA3 neural network.

10. The method as set forth in claim 9, wherein an effective pairing between any at least one ensemble of coactive neurons and another neuron scales from net inhibitory to net excitatory depending on the ensemble of coactive neurons.

11. The method as set forth in claim 10, wherein the one or more processors further perform an operation of reactivating at least one ensemble of coactive neurons at the beginning or the end of the at least one spatiotemporal sequence after learning has occurred to demonstrate prediction and recall of the at least one spatiotemporal sequence.

12. The method as set forth in claim 11, wherein the recurrent spiking CA3 neural network associates each neuron with at least one ensemble of coactive neurons.

13. The method as set forth in claim 12, wherein the one or more processors further perform an operation of using neurons with different ensembles for each spatiotemporal sequence to increase the number of spatiotemporal sequences that can be learned.

14. The method as set forth in claim 8, wherein the one or more processors further perform operations of:
   implementing an inhibitory synapse rule, wherein an ensemble of coactive neurons reduces their inhibitory coupling, and neurons that fire independently have strong inhibitory connectivity; and
   implementing an excitatory synapse rule, wherein synapses that contribute to activation of a neuron are strengthened, and synapses that are activated while the neuron is rebounding are weakened.

15. A computer program product for learning, prediction, and recall of spatiotemporal patterns, the computer program product comprising computer-readable instructions stored on a non-transitory computer-readable medium that are executable by a computer having a processor for causing the processor to perform operations of:
   receiving a noisy signal having a plurality of spatiotemporal sequences;
   learning an input spatiotemporal sequence of the noisy signal online using a recurrent spiking CA3 neural network by:
      processing the input spatiotemporal sequence having a beginning and an end using the recurrent spiking CA3 neural network based on synaptic plasticity;

determining whether the entire spatiotemporal sequence is prospectively predicted; and determining whether there are additional spatiotemporal sequences to predict;

enabling pre-play and/or replay of the spatiotemporal sequence, allowing the spatiotemporal sequence to be activated from the beginning or end of the spatiotemporal sequence such that the spatiotemporal sequence can be retrieved in a forward or a reverse order; and performing cued recall of a previously learned spatiotemporal sequence based on a partial spatiotemporal sequence using the pre-play and/or replay of the spatiotemporal sequence, wherein the recurrent spiking CA3 neural network comprises a plurality of neurons having synaptic connections comprising excitatory synaptic connections and inhibitory synaptic connections;

wherein balanced inhibitory connectivity exists between neurons having excitatory synaptic connections; and wherein the recurrent spiking CA3 neural network uses distinct forms of synaptic plasticity for excitatory synaptic connections and inhibitory synaptic connections, such that excitatory synaptic connections strengthen and inhibitory synaptic connections weaken;

completing a pattern in a spatiotemporal sequence of the noisy signal using the learned input spatiotemporal sequence; and denoising the noisy signal using the completed pattern.

16. The computer program product as set forth in claim 15, further comprising instructions for causing the processor to perform operations of:

completing coactive patterns in spatiotemporal sequences;

generalizing recall based on similarity to other experiences; and predicting at least one future spatiotemporal sequence through activation of the recurrent spiking CA3 neural network.

17. The computer program product as set forth in claim 16, wherein an effective pairing between any at least one ensemble of coactive neurons and another neuron scales from net inhibitory to net excitatory depending on the ensemble of coactive neurons.

18. The computer program product as set forth in claim 17, further comprising instructions for causing the processor to perform an operation of reactivating at least one ensemble of coactive neurons at the beginning or the end of the at least one spatiotemporal sequence after learning has occurred to demonstrate prediction and recall of the at least one spatiotemporal sequence.

19. The computer program product as set forth in claim 18, wherein the recurrent spiking CA3 neural network associates each neuron with at least one ensemble of coactive neurons.

20. The computer program product as set forth in claim 19, further comprising instructions for causing the processor to perform an operation of using neurons with different ensembles for each spatiotemporal sequence to increase the number of spatiotemporal sequences that can be learned.

21. The computer program product as set forth in claim 15, further comprising instructions for causing the processor to perform operations of:

implementing an inhibitory synapse rule, wherein an ensemble of coactive neurons reduces their inhibitory coupling, and neurons that fire independently have strong inhibitory connectivity; and implementing an excitatory synapse rule, wherein synapses that contribute to activation of a neuron are strengthened, and synapses that are activated while the neuron is rebounding are weakened.

\* \* \* \* \*